(12) United States Patent
Rimnac et al.

(10) Patent No.: US 10,366,365 B2
(45) Date of Patent: *Jul. 30, 2019

(54) SYSTEMS AND METHODS FOR MONITORING INVENTORY OF A PRODUCT WITHIN A STORAGE BIN

(71) Applicant: W.W. Grainger, Inc., Lake Forest, IL (US)

(72) Inventors: George C. Rimnac, Long Grove, IL (US); Geoffry A. Westphal, Evanston, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 332 days.

This patent is subject to a terminal disclaimer.

(21) Appl. No.: 15/236,563

(22) Filed: Aug. 15, 2016

(65) Prior Publication Data

US 2016/0350710 A1 Dec. 1, 2016

Related U.S. Application Data

(63) Continuation of application No. 14/188,204, filed on Feb. 24, 2014, now abandoned, which is a continuation of application No. 13/801,310, filed on Mar. 13, 2013, now Pat. No. 8,972,291.

(51) Int. Cl.
*G06F 16/58* (2019.01)
*G06Q 10/08* (2012.01)
*G06K 9/00* (2006.01)
*H04N 5/247* (2006.01)

(52) U.S. Cl.
CPC .......... *G06Q 10/087* (2013.01); *G06F 16/58* (2019.01); *G06K 9/00496* (2013.01); *H04N 5/247* (2013.01)

(58) Field of Classification Search
None
See application file for complete search history.

(56) References Cited

U.S. PATENT DOCUMENTS

| | | | |
|---|---|---|---|
| 8,438,084 B1 | 5/2013 | Tesler | |
| 2008/0077511 A1* | 3/2008 | Zimmerman | G06Q 10/00 705/28 |
| 2009/0060349 A1 | 3/2009 | Linaker et al. | |
| 2010/0169190 A1* | 7/2010 | Allison | G06Q 10/087 705/28 |
| 2012/0029693 A1 | 2/2012 | Bear et al. | |
| 2012/0043289 A1 | 2/2012 | Brown et al. | |
| 2014/0244392 A1 | 8/2014 | Chang | |

* cited by examiner

*Primary Examiner* — Paul Danneman
(74) *Attorney, Agent, or Firm* — Greenberg Traurig, LLP

(57) ABSTRACT

A system and method can monitor inventory of product within storage bins of a storage facility by mounting cameras to the storage bins. The cameras and a user processing device may be operably connected to a network such that the user processing device is in communication with the cameras. Further, the user processing device may search records of a database that correspond to product stored in the storage facility. Once a product of interest is identified, a location of the relevant storage bin may be provided to the user processing device, along with an image and/or video captured by the camera to show contents of the storage bin.

4 Claims, 3 Drawing Sheets

SYSTEMS AND METHODS FOR MONITORING INVENTORY OF A PRODUCT WITHIN A STORAGE BIN

CROSS REFERENCE TO RELATED APPLICATION

This application claims the benefit of and is a continuation of U.S. patent application Ser. No. 14/188,204, filed on Feb. 24, 2014, which application claims the benefit of and is a continuation of U.S. patent application Ser. No. 13/801,310, filed on Mar. 13, 2013, the disclosures of which are hereby incorporated by reference in their entirety.

FIELD OF DISCLOSURE

The present disclosure relates generally to managing product inventory and, more particularly, to systems and methods for monitoring inventory of a product within a storage bin.

BACKGROUND

Storage facilities for manufacturing companies, vendors, and the like nowadays can measure more than one million square feet, oftentimes spanning multiple buildings. Products and supplies that are used by manufacturers during a manufacturing process or maintained by vendors are typically kept in tool cribs, vending machines, containers, and other storage bins, for example. These example storage bins for storing product are known in the art. Further, these storage bins come in many shapes and sizes, but typically have a bottom, two opposed side walls, a front section, and a rear section. At least one of the front and rear sections generally has a height lower than a height of the side walls to form at least one bin opening through which product can be added and removed as necessary.

In some respects, large storage facilities are cost-efficient in that a considerable portion or even all of a manufacturer's or a vendor's inventory can be stored in one location. Yet a major problem with large storage facilities is that an individual attempting to retrieve product from a storage bin must traverse a considerable distance before arriving at the desired storage bin—only to find that inventory for that product is insufficient or exhausted. Thus employees of large storage facilities and manufacturing plants waste untold sums of time because they do not have a reliable way of monitoring the inventory of product within storage bins before proceeding to the locations of the storage bins.

Attempts to date to address this problem have proven fruitless. For example, methods of tracking each individual product in inventory, such as by incorporating radio-frequency identification (RFID) tags in each product, for example, are expensive. By way of further example, visual cues are also problematic because they often require individuals to walk the floors in search of them.

BRIEF DESCRIPTION OF THE DRAWINGS

For a better understanding of the disclosed systems and methods for monitoring inventory of a product within a storage bin, reference is made to examples shown in the following drawings.

DETAILED DESCRIPTION

To address the aforementioned need and other needs, disclosed hereinafter are example systems and methods that allow those working in manufacturing facilities, facilities that store product inventory, and/or the like to monitor product inventory in, for example, storage bins. In one example, the method involves receiving input from a user of a processing device connected to a network. The input may concern a product of interest that is kept within one of the storage bins, storage shelves, storage units, storage lockers, vending machines, etc. in the facility. The processing device may run software, a mobile device application, and/or the like that compares the input from the user to records stored in a database. Each record generally contains information about one product, such as a product name, a product SKU number, and/or a product image, for instance. The processing device may compare the input to the information in the records to identify one or more products for which the user may be searching. The comparison may be performed locally on the user processing device, remotely on another processing device, or in a distributed network environment where different processing devices perform different functions. Moreover, in some examples, the comparison may involve visual searching and/or keyword searching.

Based on the results of the comparison, the user processing device may display a list of products that match, at least partially, the input from the user. The user may select one of these products, or alternatively, the processing device may automatically display further information for a product where only one product is located as a possible match. Such information may include, for example and without limitation, a specific location within the facility at which a storage bin containing the product of interest is located. Further, the processing device may ask the user whether the processing device should transmit a signal via a network to a camera mounted to or near the storage bin containing the product of interest. If the user answers in the affirmative, the camera may acquire an image and/or video of contents of the storage bin and transmit the image and/or the video over the network to the processing device. Thus a user may remotely view the contents of virtually any storage bin and/or other storage location in the facility without having to proceed to the location of the storage area.

While the foregoing generally disclose systems and methods for monitoring inventory of a product within a storage bin, a better understanding of the objects, advantages, features, properties, and relationships of the systems and methods will be obtained from the following detailed description and accompanying drawings, which set forth illustrative examples that are indicative of the various ways in which the principles of the disclosure may be employed.

Figure 1:
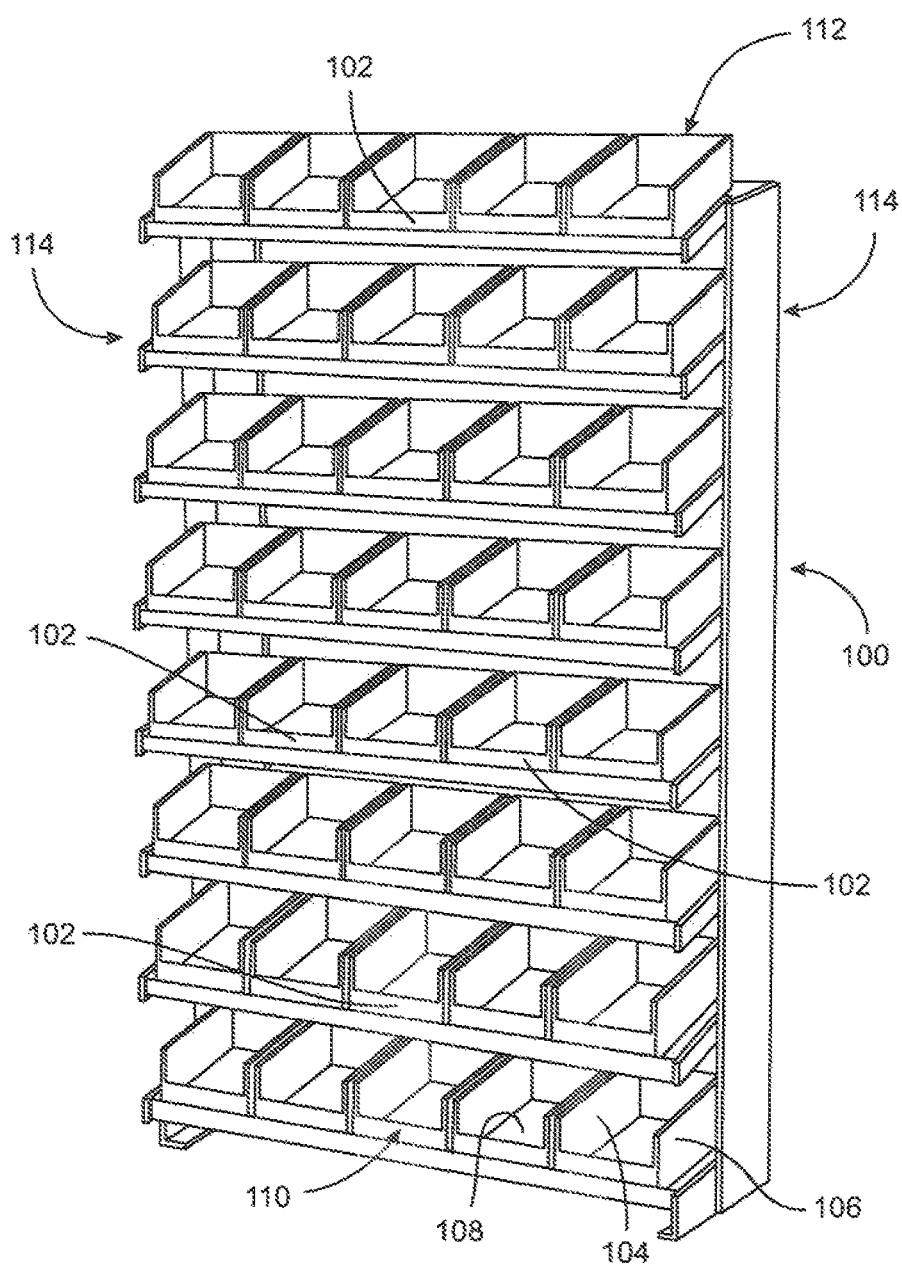
FIG. 1 illustrates storage bins disposed within an exemplary product storage rack.

With reference now to the figures, example systems and methods for monitoring inventory of product within a storage bin are disclosed. Referring to FIG. 1 specifically, an example storage rack 100 has a plurality of example storage bins 102. Each of the example storage bins 102 here has a body generally comprising two sidewalls 104, 106, a bottom 108, a front section 110, and a rear section 112. The example storage rack 100 may be largely defined by the storage bins 102 organized into vertically arranged shelves 114. In some examples, each of the storage bins 102 shown in FIG. 1 contains a different product. In other examples, however, several storage bins 102 may contain the same product. While the example storage bins 102 are shown as having a particular shape and/or size, it is to be understood that many other bin forms can be used as needed while keeping with the spirit and scope of the present disclosure. For instance, the phrase "storage bin" also includes product dispensing machines, tool cribs, and/or any other form of storage container, storage shelf, and/or other storage units, for example only.

Likewise, the example storage rack 100 is not limited to having the vertically arranged shelves 114 of the storage bins 102. For example and without limitation, another example storage rack may be twice as tall and twice as wide as the storage rack 100 shown in FIG. 1. The larger storage rack may include larger storage bins designed to hold larger product. Further, the storage racks 100 are in some instances arranged adjacent to one another and above and below one another to form an aisle of the storage racks 100. An example storage facility that stores a variety of inventory of product may include hundreds or even thousands of the example storage racks 100 arranged into a multitude of aisles.

Because some facilities are large and have many of the storage bins 102 containing a variety of product, those having ordinary skill in the art will appreciate that it may be advantageous to view inventories of the storage bins 102 remotely. Thus the present disclosure contemplates mounting a camera and/or other imaging device to each of the storage bins 102, or near the storage bins 102 such that the contents of each of the storage bins 102 may be examined. Although not shown in FIG. 1, each camera may be mounted to the body of the storage bins 102. For instance, a camera can be mounted to the rear section 112, one of the sidewalls 104, 106, or the front section 110 of the storage bin 102. In the alternative, cameras could be mounted to a cross member or guide track of the storage rack 100 disposed above the storage bin 102 of interest. Put another way, the cameras could be mounted, positioned, and/or located in any way that would allow the cameras to view contents of the storage bins 102. Further, in some examples the cameras may be video cameras. In other examples, though, the cameras may only capture still images. In still other examples, the cameras may be capable of capturing both still images and video. In some of these examples, an individual intending to view the contents of one of the storage bins 102 could specify whether a video or a still image is preferred.

In some cases, one camera may be assigned to each storage bin 102. In other cases, one camera may be assigned to several storage bins 102, by way of an advantageous vantage point or a guide track on which the camera may slide, as disclosed below. In still other cases, more than one camera may be assigned to one storage bin 102. More than one camera may be assigned to one storage bin 102, for instance, where a shape of a product may prevent a device or an individual from discerning an approximate quantity of inventory based on a single perspective view.

Nonetheless, a camera associated with each of the storage bins 102 may be operably coupled to a wired or wireless network of the storage facility such as a wide area network or a local area network, for example only. In some examples, the network may be operably coupled to the Internet, the World Wide Web, and/or a cellular network so that a plurality of processing devices may connect to the network from near or far.

To perform the functions required of the user processing devices such as, for example, reading and/or writing data to a repository associated with a content server of the network, the user processing devices include computer executable instructions that reside in program modules stored on any non-transitory computer readable storage medium that may include routines, programs, objects, components, data structures, etc. that perform particular tasks or implement particular abstract data types. Accordingly, one of ordinary skill in the art will appreciate that the user processing devices may be any device having the ability to execute instructions such as, by way of example, a personal computer (PC), a mainframe computer, a personal-digital assistant (PDA), a tablet, a cellular telephone, a mobile device, an e-reader, and/or the like. Furthermore, while the user processing devices are in some instances referred to as respective single devices, those having ordinary skill in the art will also appreciate that the various tasks described hereinafter may be practiced in a distributed environment having multiple user processing devices linked via a network, such as that disclosed above, for example, whereby the executable instructions may be associated with and/or executed by one or more of multiple user processing devices.

Further, a database, which may be stored in the repository associated with the network, can maintain a record for each product contained in the storage bins 102. A record associated with one example storage bin 102 may include data pertaining, for example and without limitation, to an identity of a camera associated with the storage bin 102, to a source path used to gain access to images or video captured by the camera, to an identifier (e.g., numerical, alphabetical, or alphanumeric) associated with and/or printed on the storage bin 102, to a type of product that is stored within the storage bin 102, to a SKU number associated with the product, to a name and/or description of the product, to an image of the product, to a location (e.g., by aisle, shelf, and aisle depth) of the storage bin 102, etc.

The present disclosure contemplates a wide variety of contexts in which it would be advantageous to view inventory of storage bins remotely. One example context involves using a camera to view whether inventory of product for one of the storage bins 102 is full, low, or exhausted. Another example context involves using a camera to verify that a particular product and storage bin number are properly associated. Yet another example context involves using a camera to determine whether a product such as a particular tool from a tool crib, for example, is available for use or sale.

Figure 2:
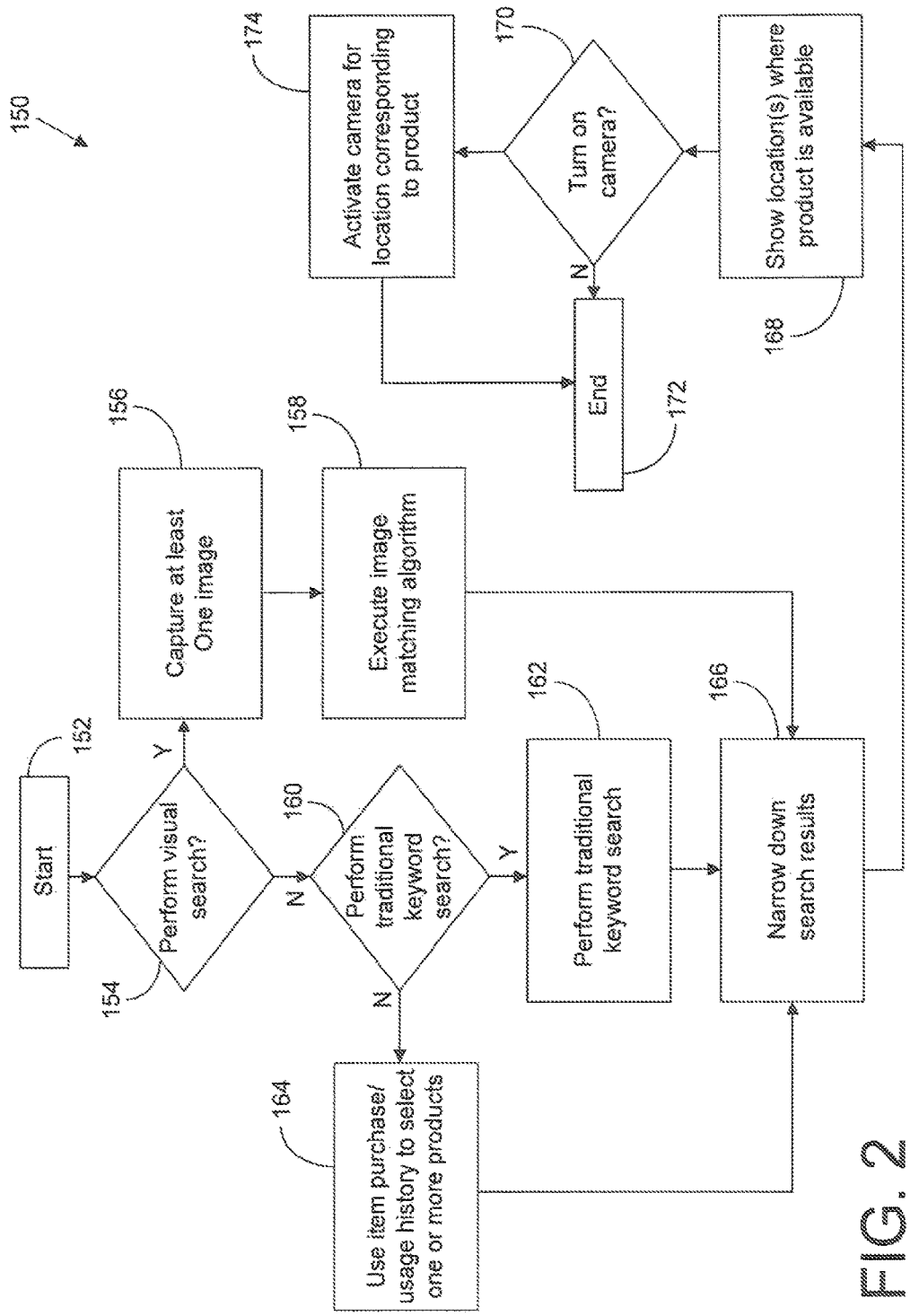
FIG. 2 is a flow diagram of an example method for monitoring inventory of a product within a storage bin.

Still another example context in which mounting cameras to or near the storage bins 102 is advantageous is represented by a flow diagram in FIG. 2. In general, FIG. 2 illustrates an example method for monitoring inventory of a product within a storage bin 150. The method 150 may in some examples utilize an application on a mobile device or software installed on a PC, for instance. In this example method 150, a user of the process may be an employee of a manufacturer or a vendor, for instance, running an application on a mobile device. In this example, the user may start the application on the mobile device that is connected to the network to start the process, as represented by a step 152. The application may ask the user if the user wishes to perform a visual search, as represented by a step 154. If the user chooses to perform the visual search, a camera associated with the storage bin and in communication with the mobile device may capture one or more images of a product that the user needs or is interested in, as represented at a step 156. For instance, a hammer drill that the user was employing may have broken down to the point that a replacement is needed. The user may wish to check the inventory of hammer drills of the same make and model without proceeding to the storage bin 102 containing such hammer drills. The user may be in another part of the storage facility, or at any other location remote from the storage facility.

After the mobile device captures an image of the product being queried, the application may execute an image matching algorithm, as represented by a step 158. The image matching algorithm may compare the captured image to images of products stored in the database in the repository, as disclosed above. The matching algorithm may use techniques known in the art, such as those disclosed in U.S. Pat. No. 7,720,307 to Iizuka, entitled "IMAGE MATCHING METHOD, PROGRAM, AND IMAGE MATCHING SYSTEM," the entirety of which is hereby incorporated by reference. Also, because the visual search focuses on an appearance of the product, the visual search may locate products within the facility's inventory even if the product being replaced was purchased through another vendor or acquired through another source. Even for products that are not generally maintained as part of the facility's inventory, the database may include records for products acquired elsewhere. In response to a search for a product having exhausted inventory, the vendor or manufacturer can locate a supplier and acquire one or more of the product. In addition or in the alternative, the vendor or manufacturer may keep track of all of the products that are searched, visually or otherwise. If the vendor or manufacturer experiences enough searches for a particular product that the vendor or manufacturer does not typically stock, the vendor or manufacturer may begin doing so.

As those having ordinary skill in the art will understand, the present disclosure contemplates a plethora of ways in which to use a system for monitoring the inventory of product within storage bins. For instance, in some examples a computer performs tasks such as comparing the captured image to images of products stored in the database in the repository and ordering additional product when supplies are found to be low. In other examples, however, a user of the system may perform such tasks in place of the computer. In still other examples, the user of the system may approve one or more determinations that the computer has made, such as approving a determination that the amount of product in stock is at a particular level or approving an order to replenish a product.

Moreover, in some cases, the system may ask particular users to approve or make certain determinations. By way of example, the system may prompt the last person that retrieved product from a particular storage bin to fulfill an order to view a captured image of the contents of the storage bin and determine whether additional product should be obtained for restocking purposes. In still another example, to promote efficiency, a user of the system may be asked to review a plurality of captured images corresponding to a plurality of storage bins all at once. For instance, an employee of the manufacturer, vendor, or other entity employing the system could periodically review a plurality of images associated with all of the storage bins, or in some cases a subset of the storage bins (e.g., only those storage bins that the system has preliminarily determined may need replenishing). As a result of this manner of review, select users of the system could develop expertise in determining whether and when product must be replenished.

In any event, with continued reference to FIG. 2, if the user elects not to perform the visual search, the application may ask the user whether to perform a keyword search, as represented by a step 160. If the user answers this question in the affirmative (e.g., by entering keywords that describe the product), the application may perform the keyword search, as represented by a step 162.

Still further, if the user chooses not to perform the keyword search, the user may locate or enter other input, as represented at a step 164. For example, the user may review recent purchases or usage histories to select one or more products to query. By way of further example, the application may provide the user with a list of products that the user recently queried or a list of products that the user has marked as favorites. To illustrate further, the user may search by model numbers, category drill-downs, selection guides, personal lists, and/or the like.

One example purpose of performing the visual search, performing the keyword search, or using other information to select one or more products is to narrow down the search results, as represented by a step 166. The application may compare the input against information in the database in the repository as part of an effort to identify one or more products in which the user may be interested. Based on this comparison, the search results may include image thumbnails, product names, brand names, brief descriptions, and/or the like corresponding to one or more products that the application has identified based on the input provided by the user. In turn, the user may select one or more of these products for further information.

In addition, it should be understood that comparisons can occur either remotely from or locally to the user processing device, which is a mobile device in this example. For instance, the mobile device may in some examples transmit the input entered by the user via the network to another processing device that performs the comparison. In the alternative, the mobile device may in other examples download the database, and the application running on the mobile device may compare the input from the user to the database.

Although not shown, it should be understood that the application may also allow the user to enter more specific input that would allow the application to take the user straight to the step 170 where the user is asked if the camera corresponding to the product should be activated. Such input may include SKU numbers and/or bin identifiers, for example and without limitation.

In some examples, the further information for a product may include virtually any information that is part of a record. In some examples, each record is associated with a product. In other examples, each record is associated with a storage bin. In one example, this further information involves displaying a location within the storage facility where one or more storage bins 102 containing that product are stationed, as represented by a step 168. As disclosed above, a particular product may be stored within more than one of the storage bins 102, so in some cases numerous locations may be provided. Where numerous locations are provided, the application may identify which of the storage bins 102 is closest to the user based, for example, on a wireless router within the facility or a global positioning system (GPS) that can identify a location of the user's mobile device. Fortunately, in many cases the storage bins 102 that contain the same product are stored nearby, if not adjacent to one another, or are at least strategically located. As also disclosed above, the location may include, for example and without limitation, an aisle, a shelf, and an aisle depth where the storage bin 102 is stationed. The aisle depth may refer to how far into the aisle the storage bin 102 is located. Likewise, the further information may include an identifier associated with and/or printed on the storage bin 102.

Once the user selects a product from a list of results, which may include functional alternatives in some examples, the application may also ask the user whether to turn on a camera mounted to the storage bin 102 containing the product of interest, as represented by a step 170. In examples where more than one storage bin 102 contains the product of interest, the application may provide the user with an option to turn on any of these cameras. If the user declines, the process 150 may terminate, as represented by a step 172. If the user accepts, though, the camera mounted to or near the storage bin 102 containing the product may be activated based on information associated with that storage bin 102 such as, for example and without limitation, the location and/or identifier of the storage bin 102. Camera activation is represented by a step 174 shown in FIG. 2.

Depending on the type of camera and settings preferred by the facility, activating the camera may involve any number of different procedures. In some examples, activating the camera simply means turning on a video camera—and thereby streaming "live" video of the contents of the storage bin 102 captured by the camera over the network to the user's mobile device. In some instances, the camera may be activated until the user deactivates the camera and turns it off. In other instances, the camera may be activated for a period of time such as twenty seconds, forty seconds, or three minutes, for example only. In this way, the camera may automatically be deactivated after a period of time so as to prevent the user from having to deactivate the camera, to save energy, to preserve network resources, and/or to extend a life of the camera, for example. In other examples, the camera may capture a still image of the inventory of the storage bin 102. As those having ordinary skill in the art will appreciate, the camera may include a light or a flash that is activated while the camera is capturing images or video. The light may illuminate the contents of the storage bin 102. By viewing the contents of the one or more storage bins 102 in real-time, the user can make any number of determinations including, for example, whether to proceed to the location of the one or more storage bins 102, or to take other action such as placing an order to replenish product inventory.

In still other examples, the cameras may be programmed to capture images or video of the storage bins 102 at periods throughout each day, week, month, or year. In some of these examples, the period may depend on how frequently a product's inventory is exhausted. Such images or video may help determine how inventory for a certain product fluctuates between periods. Identifying patterns of fluctuation in product inventory may help eliminate surplus or insufficient product inventory.

Moreover, in some examples, one of the processing devices connected to the network may be configured to automatically detect when one of the storage bins 102 needs replenishing. For instance, the processing device may periodically run an image matching algorithm comparing an instant image of one of the storage bins 102 to benchmark images that show the storage bin 102 in different states such as full, half full, low, and/or empty, for example. The processing device may automatically reorder the product contained in the storage bin 102 when inventory in the storage bin 102 reaches a predetermined threshold, which may depend on a rate at which the particular product's inventory typically diminishes. Thus, for product that diminishes quickly, the processing device may reorder product when the storage bin 102 is half full. By contrast, for product that is diminished less quickly, the processing device may reorder product when the storage bin 102 is low.

Those having ordinary skill will understand that many variations to this process 150 are contemplated by the present disclosure. For instance, in one example, once the user selects a product the application on the user's mobile device may automatically activate the camera and provides the user with an image of the contents of the storage bin 102 along with a location of the storage bin 102.

Figure 3:
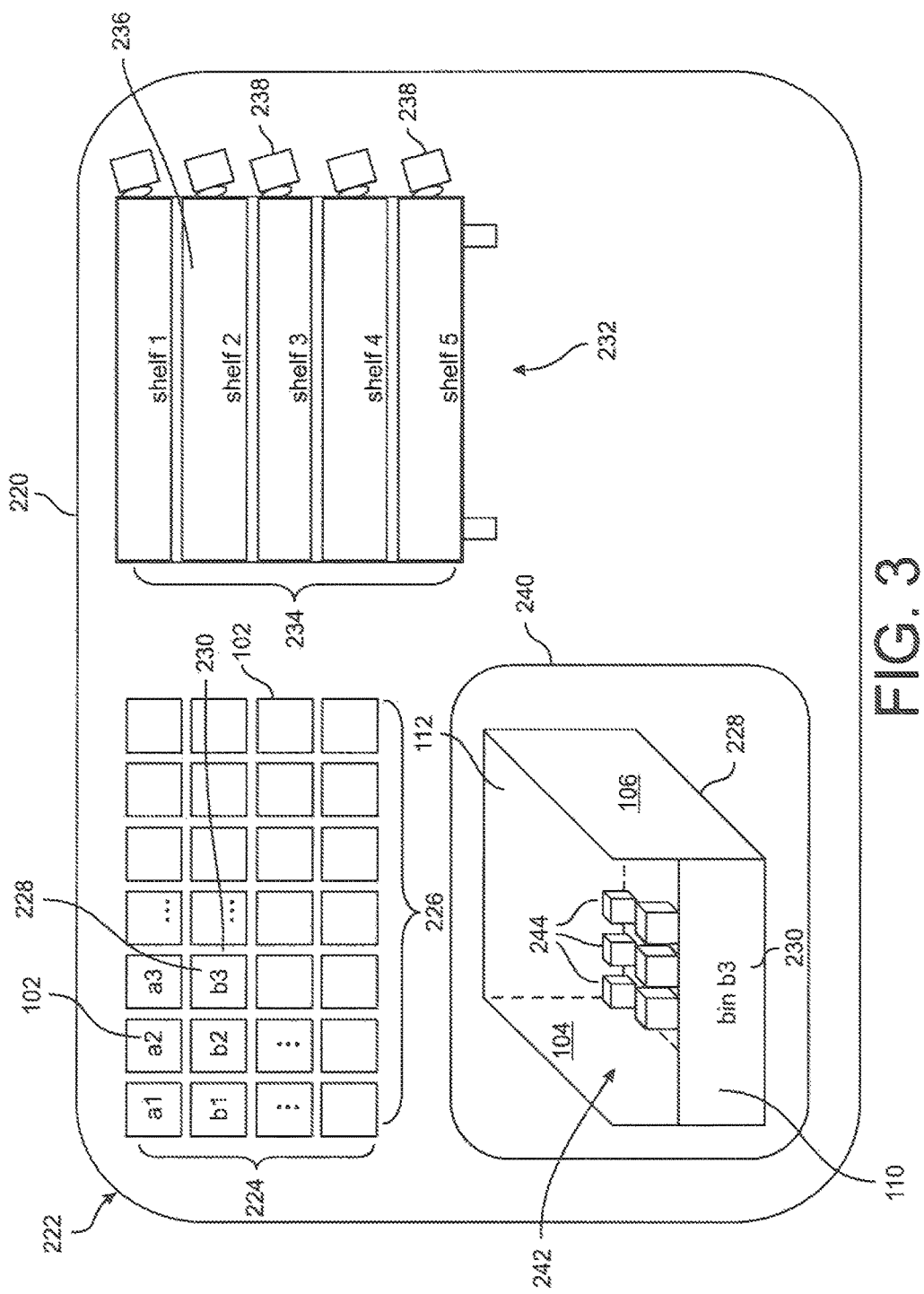
FIG. 3 illustrates an example user interface that may be displayed on a user processing device as part of the example method disclosed with reference to FIG. 2.

Turning to FIG. 3, an example user interface 220 is shown. The user interface 220 may be displayed on a user processing device such as the mobile device disclosed above with reference to FIG. 2. The user interface 220, moreover, may be displayed at any point in the process 150 at the user's discretion. Still further, one or more portions of the example user interface 220 may displayed at different steps of the process 150. These portions may also be zoomed in for a full screen view or for further information. One example of where the application may cause the user interface 220 to be displayed on the mobile device is at the step 168 where the application shows the location where the identified product is available.

In keeping with that example, the example user interface 220 includes a grid 222 that represents a top schematic view of aisles 224 and aisle depths 226 of the facility in which storage bins 102 may be contained on storage racks 100 or other structures. Thus the product that the user identified is shown by shading to be stored in a storage bin 228 having an identifier 230 of "b3," which may be truncated and hence for purposes of illustration only. Those having ordinary skill in the art will appreciate that the identifier 230 may in some examples identify, at least in part, a location of the storage bin 228. Here, the identifier 230 of "b3" indicates that the storage bin 228 containing the identified product is in aisle "b" with an aisle depth of "3," meaning the third storage bin in the aisle. Typically, however, layouts of facilities are not as simple as that shown in the grid 222. Therefore, to assist the user in proceeding to the storage bin 228, the user interface 220 may in some examples display a map or layout of the facility with the location or locations of destination storage bins highlighted, along with routes thereto.

The user interface 220 may also include an example side schematic view 232 of the aisle "b." The side schematic view 232 has vertically arranged shelves 234, with shading indicating that the storage bin 228 is located on "shelf 2" 236. The side schematic view 232 may further include representative images of cameras 238 mounted to the storage bins of the shelves 234.

Those having ordinary skill in the art will understand that the identifier 230 of "b3" may have been truncated. In some examples, it would be helpful to include more alphanumeric characters to the identifier 230 to indicate that the storage bin 228 of interest is located on the "shelf 2" 236. Thus, for instance, the identifier 230 could be "b3s2" to indicate that the storage bin 228 is in aisle "b," aisle depth "3," and "shelf 2" 236. What's more, if the storage facility included several buildings, the identifier 230 could further include a prefix to identify the building in which the storage bin 228 is located.

In addition, the example user interface 220 further includes an example image 240 of contents 242 of the storage bin 228 captured by a camera mounted in front of the storage bin 228. As shown in FIG. 3, the image 240 shows that the contents 242 of the storage bin 228 include six products 244. In other examples, the camera may be mounted to the rear section 112 of the storage bin 228, which would provide a slightly different vantage point for an image or, in some examples, video. In still other examples the camera may be mounted to the sidewalls 104, 106 or the front section 110 of the storage bin 228. In still further examples the camera may be slidably attached to a guide track that runs above or in front of the storage bin 228. In these examples, the camera could travel along the guide track when requested or scheduled to acquire images or video of a number of different storage bins. By sharing cameras across groups of storage bins, fewer cameras would be needed.

Further, the user interface 220 is interactive in many examples. For instance, the user may select any of the vertically arranged shelves 234 or the storage bins shown 102 in the grid 222 to show the availability of any product. Yet further, those having ordinary skill will appreciate that the present disclosure can be implemented both in facilities where individuals retrieve products from storage bins and in facilities where programmable devices retrieve products from storage bins.

Still further, while the present disclosure has been described primarily in the context of example methods, those having ordinary skill in the art will readily appreciate that the components disclosed with respect to the example methods may be equally applicable to a system for monitoring inventory of a product within a storage bin. For example, an example system may include at least one camera, at least one storage bin, and a user processing device. The user processing device and the camera may be connected to a network such that the user processing device can activate and, in some cases, deactivate the camera that captures images and/or video of contents of the at least one storage bin. When the camera is activated, the user processing device receives via the network the images and/or video of contents of the at least one storage bin. Thus, to avoid duplication, the present disclosure will omit a full duplicative discussion of example systems, as they have already been disclosed above within the context of the example methods.

One having ordinary skill in the art will recognize that the disclosed example systems and methods may be used in a variety of contexts. For example, the hardware associated with one example system may be installed at a warehouse and utilized as part of a service provided to a company operating out of the warehouse. The company would be notified as quantities of product are depleted and need replenishment. In another example, the company may not necessarily be operating out of the warehouse, but may instead be supplying product to a distributor that operates out of the warehouse. The distributor may in fact be the party that is providing the service, and may notify the company when the distributor requires more product from the company. Still further, the distributor and the company may in some cases sell competing products, where the distributor sells both the company's brand name product and its own house branded product. Furthermore, in such examples, data could be collected as to which of the company's products are being restocked most frequently. These products could be identified by a bar code, QR code, visual inspection, description match, or the like. In some examples, this data could be used to the competitive advantage of the provider of the service. For instance, if the provider of the service sells a house branded product that is comparable to the company's brand name product that is selling out quickly, the provider may promote its comparable product more aggressively. In other examples, this data could be sold to interested parties.

While various concepts have been described in detail, it will be appreciated by those of ordinary skill in the art that various modifications and alternatives to those concepts could be developed in light of the overall teachings of the disclosure. For example, while various aspects of the present disclosure have been described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each aspect of the disclosure is not necessary for an enabling understanding of the disclosure. Rather, the actual implementation of the systems and methods would be well within one of ordinary skill in the art, given the disclosure herein of the attributes, functionality, and inter-relationship of the various components in the system. Therefore, a person of ordinary skill in the art will be able to practice the disclosure set forth in the claims without undue experimentation. It will be additionally appreciated that the particular concepts disclosed are meant to be illustrative only and not limiting as to the scope of the disclosure which is to be given the full breadth of the appended claims and any equivalents thereof.

What is claimed is:

1. A system for monitoring inventory of a product in a storage bin, comprising:
   a plurality of cameras; and
   a processing device in communication with each of the plurality of cameras via a network;
   wherein the processing device includes a memory device having stored thereon instructions which, when executed by the processing device, cause the processing device to perform steps comprising:
   receiving input from a user of the processing device;
   using the received input to identify within a data repository associated with the processing device a one of a plurality of storage bins in a facility;
   using the identified one of a plurality of storage bins to identify within the data repository a one of the plurality of cameras;
   causing a signal to be transmitted to the identified one of the plurality of cameras via the network to activate the identified one of the plurality of cameras wherein activating the identified one of the plurality of cameras causes the identified one of the plurality of cameras to capture at least one image, at least one video, or at least one image and at least one video of at least an interior of the identified one of the plurality of storage bins;
   receiving by the processing device the at least one image, the at least one video, or the at least one image and the at least one video caused to be captured by the activated, identified one of the plurality of cameras; and
   displaying on the processing device the at least one image, the at least one video, or the at least one image and the at least one video received from the activated, identified one of the plurality of cameras.

2. The system as recited in claim 1, wherein the at least one image, the at least one video, or the at least one image and the at least one video caused to be captured by the activated, identified one of the plurality of cameras are transmitted wirelessly via the network to the processing device.

3. The system as recited in claim 1, wherein the processing device is further caused to display on a display associated with the processing device a route to the identified one of the plurality of storage bins in the facility, the route being displayed in reference to a map of the facility.

4. The system as recited in claim 3, wherein the displayed route shows an aisle, an aisle depth, and a shelf where the identified one of the plurality of storage bins is located in the facility.

* * * * *